United States Patent [19]

Paterson et al.

[11] Patent Number: 4,951,047
[45] Date of Patent: Aug. 21, 1990

[54] NEGATIVE CLIMB AFTER TAKE-OFF WARNING SYSTEM

[75] Inventors: Noel S. Paterson, Bothell; Everette E. Vermilion, Seattle, both of Wash.

[73] Assignee: Sunstrand Data Control, Inc., Redmond, Wash.

[21] Appl. No.: 494,589

[22] Filed: May 13, 1983

[51] Int. Cl.⁵ .............................................. G08B 21/00
[52] U.S. Cl. ................................... 340/970; 244/180; 340/963; 364/433
[58] Field of Search .............. 340/959, 960, 963, 964, 340/967, 970, 973, 975, 977, 968; 364/427–430, 431.01, 433, 434, 435; 73/178 T,178 H, 178 R; 244/180, 183; 343/7 TA, 5 LS; 342/65

[56] References Cited

U.S. PATENT DOCUMENTS

| | | | |
|---|---|---|---|
| 3,691,356 | 9/1972 | Miller | 73/178 T |
| 3,925,751 | 12/1975 | Bateman et al. | 340/384 R |
| 3,946,358 | 3/1976 | Bateman | 340/970 |
| 3,947,808 | 3/1976 | Bateman | 340/970 |
| 3,947,810 | 3/1976 | Bateman et al. | 340/959 |
| 3,958,218 | 5/1976 | Bateman | 340/970 |
| 4,030,065 | 6/1977 | Bateman | 73/178 T |
| 4,060,793 | 11/1977 | Bateman | 340/964 |
| 4,121,194 | 10/1978 | Downey et al. | 340/959 |
| 4,319,218 | 3/1982 | Bateman | 340/959 |

Primary Examiner—Joseph A. Orsino
Assistant Examiner—Brent A. Swarthout
Attorney, Agent, or Firm—Mason, Kolehmainen, Rathburn & Wyss

[57] ABSTRACT

A warning system for aircraft compares the rate of descent of the aircraft with its altitude above ground after take-off, and generates warning if the aircraft is experiencing an excessive descent condition for the radio altitude at which the aircraft is flying. The position of the landing gear, the speed of the aircraft and the engine power are mointored to enable the system only during the take-off or missed approach phases of operation in order to minimize false warnings during other phases. The relationship between radio altitude and descent rate required to generate a warning is optimized for small, high performance aircraft such as fighter or attack aircraft.

24 Claims, 1 Drawing Sheet

NEGATIVE CLIMB AFTER TAKE-OFF WARNING SYSTEM

BACKGROUND OF THE INVENTION

1. Field of the Invention

This invention relates to the field of aircraft ground proximity warning systems, and more particularly to systems that warn of excessive aircraft descent rates after take-off or during a go-around after a missed approach, and more particularly to systems optimized for high performance aircraft such as fighter or attack aircraft

2. Description of the Prior Art

Ground proximity warning systems that warn of aircraft descent after take-off or during a go-around after a missed approach are known Examples of such systems are disclosed in U.S. Pat. Nos. 3,946,358; 3,947,808; 3,947,810 and 4,319,218, assigned to the assignee of the present invention. The systems disclosed in the '358 and '808 patents provide a warning if the descent rate of the aircraft exceeds a predetermined rate below a given altitude, and the systems disclosed in the '810 and '218 patents generate a warning if the altitude loss exceeds a predetermined value before a predetermined altitude is reached.

While these systems do provide a way to warn the pilot of an aircraft of a hazardous condition resulting from an excessive sink rate or from an excessive altitude loss during the take-off or missed approach phase of operation, these systems are designed for use in transport aircraft, and not for use in highly maneuverable, high performance aircraft such as fighter or attack aircraft whose flight and operational characteristics are entirely different than those of transport aircraft. Consequently, the systems designed for transport aircraft can provide false warnings during certain normal operational conditions of a high performance aircraft, and provide no warning or an inadequate warning during other flight conditions.

SUMMARY OF THE INVENTION

Accordingly, it is an object of the present invention to provide a negative climb after take-off warning system that is particularly suitable for use in maneuverable, high performance aircraft such as fighter or attack aircraft.

It is another object of the present invention to provide an excessive descent rate warning system suitable for use in high performance aircraft that has the warning envelope tailored to meet the operational and performance characteristics of such aircraft.

It is yet another object of the present invention to provide an excessive descent warning system for fighter or attack aircraft having enabling and disabling logic that enables the warning function as a function of altitude, airspeed, engine power and landing gear position during the take-off and missed approach phases of flight, and disables it during other phases of flight to minimize nuisance warnings.

The operational and flight characteristics of a high performance aircraft such as a fighter or attack aircraft are considerably different than those of a transport aircraft. Upon take-off, a fighter or an attack aircraft is heavily laden with fuel and weapons, and because its aerodynamics are designed for high-speed operation, the rate of climb of such an aircraft is low initially. Therefore, upon takeoff, the aircraft is maintained in a relatively level flight path until sufficient speed to permit a higher rate of climb is achieved. The level flight portion of the take-off is a particularly dangerous condition because it occurs at low altitude, and if the pilot becomes distracted or disoriented, he may inadvertently allow the aircraft to descend into the ground. Such disorientation is particularly likely during take-off at night, particularly over water, such as, from an aircraft carrier where the pilot may lose visual reference and allow the aircraft to descend into the water. Consequently, it is desirable to provide the pilot with a unique voice warning, such as, "DON'T SINK", to alert the pilot of the impending ground strike with sufficient warning time to enable him to take corrective action. However, the warning should only be given when an actual ground strike is imminent, and not during other phases of flight where high rates of descent are intentionally produced, such as during the landing phases of the flight, and during certain tactical maneuvers.

Briefly, the system according to the invention becomes active at an altitude of approximately 20 feet, or virtually as soon as the aircraft is off the ground and the signals from the various instruments are valid, and remains active as long as the aircraft remains below 100 feet of altitude above the ground. The system is responsive to relatively low sink rates to provide a warning if the sink rate exceeds 25 feet per minute at 20 feet of radio altitude, and gradually increases the sink rate necessary to generate a warning until a sink rate of 125 feet per minute is required to generate a warning at 100 feet of altitude. Above 100 feet of altitude above the ground, no warning is generated. A specific voice warning, such as "DON'T SINK", is generated to indicate unambiguously that the aircraft is descending too rapidly.

In order further to prevent false warnings during phases of flight other than the take-off or go-around phases, logic circuitry is provided to enable the system only during the take-off and go-around phases. This circuitry monitors the airspeed of the aircraft, the position of the landing gear and the RPM of the engine, which is indicative of engine power, in order to determine whether the aircraft is actually in a take-off phase or in a missed approach/go-around phase. Once it has been established that the aircraft is indeed in a take-off or a missed approach/go-around phase, the system monitors the barometric altitude rate and the radio altitude, and issues a voice warning, such as "DON'T SINK", when a dangerous descent condition exists.

DESCRIPTION OF THE DRAWING

These and other objects and advantages of the present invention will become readily apparent upon consideration of the following detailed description and attached drawing, wherein.

DETAILED DESCRIPTION OF THE PREFERRED EMBODIMENT

Figure 1:
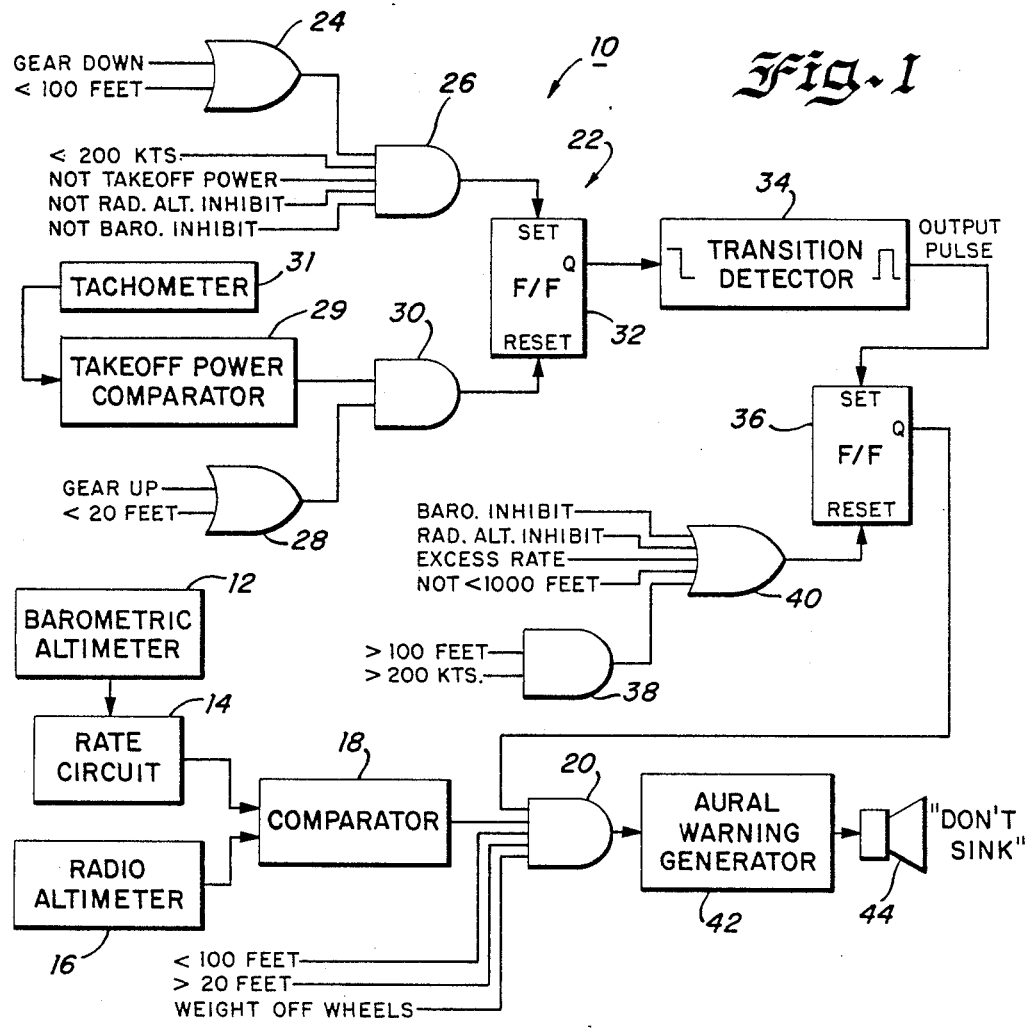
FIG. 1 is a functional block diagram of one implementation of the warning system according to the invention.

A system according to the invention capable of providing the warning described above without generating excessive false warnings is illustrated in FIG. 1, and designated generally by the reference numeral 10. The system 10 according to the invention is illustrated in FIG. 1 in functional or logical block diagram form as a series of gates, comparators, flip-flops and the like for purposes of illustration; however, it should be understood that the actual implementation of the logic can be other than as shown in FIG. 1, with various digital and analog implementations being possible. The signals used by the warning system as described include radio altitude, barometric altitude, barometric altitude rate, airspeed, a signal representative of engine power, such as, engine RPM, a signal indicating the position of the aircraft landing gear and various validity signals. Depending on the type of aircraft in which the warning system is installed, the signals shown in FIG. 1 can be obtained from individual instruments such as a barometric altimeter 12, a barometric altitude rate circuit 14, a radio altimeter 16 and from a discrete circuit element indicating the position of the landing gear, or from a digital data bus in certain newer aircraft.

In order to determine whether or not the aircraft is in an excessive descent condition, for example, losing altitude at an excessive rate, a barometric altitude rate signal is applied to a comparator 18. The barometric rate signal may be obtained from the barometric rate circuit 14 which differentiates the signal from the barometric altimeter 12, or from another suitable source. The barometric rate signal is compared with a signal indicating the altitude of the aircraft above the ground, such as the signal from the radio altimeter 16. The term "ground", as used to describe the present invention, is intended to mean not only flat dry ground, but is intended to include other topographical features of the earth such as water, swamp and uneven terrain. Also, although an excessive descent rate is given as an example of an excessive descent condition, the term "excessive descent condition", as used herein, is not intended to be limited to an excessive descent rate, but is intended to encompass other altitude related dangerous flight conditions including, for example, excessive altitude loss and insufficient altitude gain.

The barometric rate signal is compared with the signal from the radio altimeter 16 by the comparator 18, and a warning initiation signal is issued by the comparator 18 if the value of the barometric rate signal indicates an excessive descent rate for a given value of the radio altitude signal. The warning initiation signal from the comparator 18 is applied to one of the inputs of an AND gate 20 which causes the warning to be generated if the warning initiation signal, as well as certain other enabling signals, are applied thereto. These other signals relate to the flight configuration of the aircraft, and permit a warning to be generated only if the aircraft is in the take-off or go-around phase of flight.

Among the other inputs applied to the AND gate 20 are a WEIGHT OFF WHEELS signal that may be obtained, for example, from a discrete on the landing gear, in order to indicate to the system that the aircraft is not on the ground. This signal also disables the system when the aircraft is on the ground. Another signal applied to the gate 20 is a GREATER THAN 20 FEET signal which disables the system when the aircraft is below 20 feet of radio altitude where accurate barometric rate signals cannot be obtained.

Another signal applied to the gate 20 is a LESS THAN 100 FEET signal which enables the system only when the aircraft is flying at 100 feet of radio altitude or below. The purpose of this signal is to disable the system above 100 feet because, in the operation of a typical fighter or attack aircraft, a warning is not necessary once the aircraft has exceeded 100 feet of radio altitude, and maintaining the system active above 100 feet of altitude may cause false warnings in other phases of flight. Both the LESS THAN 100 FEET and the GREATER THAN 20 FEET signals can readily be obtained, for example, from one or more comparators (not shown) that receive the altitude signal from the radio altimeter 16 and provide discrete output signals at various predetermined radio altitudes.

As previously discussed, it is desired to have the warning system enabled only during the take-off and the missed approach/go-around phases of flight. Consequently, logic must be provided to determine when such flight conditions actually exist. In the illustrated embodiment, the logic for determining whether a take-off or a missed approach/go-around condition exists is provided by logic circuitry 22 which includes an OR gate 24, an AND gate 26, an OR gate 28, an AND gate 30, a set/reset flip-flop 32, a transition detector 34 and a set/reset flip-flop 36.

Basically, the function of the aforementioned logic circuitry 22 is to discriminate between the take-off and landing approach phases of a flight. The criteria required to define a take-off phase are that the landing gear of the aircraft is up or that the aircraft is below 20 feet of radio altitude and that the engine or engines are developing take-off power. The above criteria are determined by the AND gate 30 which receives a signal indicating that the engine is developing take-off power. Such a signal may be obtained, for example, from a take-off power comparator 29 that receives a signal representative of the RPM of the engine from a tachometer 31 and provides the take-off power signal to the AND gate 30 when the speed of the engine exceeds a predetermined RPM required for take-off, for example, when the RPM of the primary compressor of a jet engine exceeds 90% of the maximum RPM. Alternatively, the signal indicative of take-off power can be obtained from other sources, for example, throttle position. The AND gate 30 also receives another signal from the OR gate 28 which provides an enabling signal to the AND gate 30 if either the gear is up or the altitude of the aircraft is less than 20 feet. The GEAR UP signal for the gate 28 can be obtained from a discrete on the landing gear or on the landing gear control handle, and the LESS THAN 20 FEET signal can be obtained from a comparator monitoring the radio altimeter signal. The less than 20 foot criterion is particularly useful for detecting a take-off condition immediately after the aircraft leaves the ground and before the pilot has had a chance to raise the gear. When both inputs of the AND gate 30 are enabled, the set/reset flip-flop 32 is toggled to its reset condition. This again is the take-off condition.

When the aircraft is on the approach phase of its flight, the warning system should be disabled. The disabling function is provided by the OR gate 24 and the AND gate 26 which cooperate to set the set/reset flip-flop 32 during the approach phase of the flight. The approach phase is indicated by the landing gear being down or the radio altitude of the aircraft being less than 100 feet and the speed of the aircraft being less than 200 knots and the engine not developing take-off power. Signals representative of these conditions are applied to the AND gate 26. In addition, the radio altimeter and the barometric altimeter must not be inhibited because, if they were, any warning generated by the system would be a nuisance.

In addition to being able to discriminate whether the aircraft is in its take-off or approach phase of flight, it is also necessary to determine whether the aircraft is in a phase of flight other than a take-off or an approach phase. This determination is made by an AND gate 38 and an OR gate 40 which serve to reset the flip-flop 36 when the aircraft is operating in a phase of flight other than take-off or approach. This is accomplished by monitoring the airspeed and the altitude above ground of the aircraft and indicating a phase of flight other than take-off or approach when the speed of the aircraft is above 200 knots and the altitude is not less than 100 feet, or when the altitude exceeds 1,000 feet, as occurs in a closed pattern. Under these conditions, the AND gate 38 provides a signal to the OR gate 40 to cause the OR gate 40 to reset the set/reset flip-flop 36 to thereby disable the warning system. Other inputs that disable the warning system are also applied to the gate 40. These inputs disable the system when either the barometric altimeter or the radio altimeter are inhibited, when an excess rate signal indicating an invalid rate signal is present.

In operation, when the aircraft is taking off and take-off power is present, the gate 30 resets the flip-flop 32 when the aircraft lifts off the ground or raises its landing gear. This causes the Q output of the flip-flop 32 to switch from its high state to its low state. This transition is detected by a transition detector 34 which provides an output pulse upon the occurrence of a high-to-low transition at its input. The output pulse from the transition detector 34 sets the set/reset flip-flop 36, thereby causing the Q output of the flip-flop 36 to go to its high state and to enable the AND gate 20. This sets the system into the take-off mode, and permits the AND gate 20 to respond to an excessive sink rate signal from the comparator 18. The AND gate 20 responds to the excessive sink rate signal by providing a signal to a warning generator 42, thereby causing the warning generator 42 to apply a voice signal, either directly or indirectly, to a loudspeaker 44 or other transducer. Preferably, the generator 42 includes a digital voice synthesizer capable of generating a synthesized message such as "DON'T SINK" that advises the pilot of the specific danger so that he may immediately take corrective action. Examples of digital warning generators and how they are used in aircraft warning systems are disclosed in U.S. Pat. Nos. 3,925,751, 4,030,065 and 4,060,793.

As the aircraft continues to climb and the altitude exceeds 100 feet and the airspeed exceeds 200 knots, or when the altitude exceeds 1,000 feet, as occurs in a closed pattern, the set/reset flip-flop 36 is reset by the gates 38 and 40 to thereby inhibit the gate 20. The gate 20 remains inhibited during the remainder of the flight; however, when the aircraft descends on its approach to a landing, the flip-flop 32 is set when the landing gear is down or the aircraft reaches an altitude of less than 100 feet and the airspeed is less than 200 knots and take off power is not present. The flip-flop 32 is set so that if a missed approach occurs and take-off power is called for when the gear is up or the aircraft drops below 20 feet, the set/reset flip-flop 32 may again be reset to generate a set-to-reset transition. The set-to-reset transition will cause the transition detector 34 to again set the set/reset flip-flop 36 to enable the gate 20 to thereby again enable the warning system during the go-around phase of the missed approach.

Figure 2:
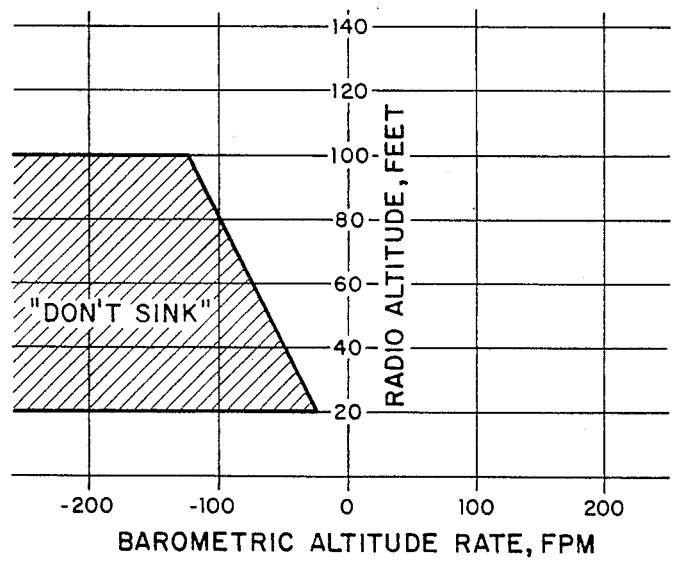
FIG. 2 is a graph illustrating the relationship between radio altitude and the barometric altitude sink rate that the aircraft must attain to generate a warning.

The sink rate versus radio altitude criteria necessary to provide a warning are illustrated in the graph of FIG. 2. As is illustrated by the shaded area of the graph of FIG. 2, the system is enabled only when the radio altitude of the aircraft is between 20 and 100 feet. Although the enabling in this range of altitudes may be accomplished in a variety of ways, in the embodiment illustrated in FIG. 1, it is provided by the LESS THAN 100 FEET and GREATER THAN 20 FEET inputs to the AND gate 20. The diagonal line between 20 feet and 100 feet altitudes has been selected to suit the operating characteristics of a typical high performance fighter/attack aircraft such as the Fairchild A10 aircraft. The slope and end points of the diagonal line may be implemented in a variety of ways, both analog and digital, but in the embodiment illustrated in FIG. 1, are generated by the comparator 18 which receives properly scaled signals from the rate circuit 14 and the radio altimeter 16. The slope of the diagonal line in FIG. 2 is selected to provide a constant warning time to the pilot, regardless of the point on the diagonal line the warning envelope is penetrated. In the embodiment shown, the system provides a constant warning time prior to impact of 0.8 minutes (48 seconds). The "DON'T SINK" voice warning is generated when the negative rate signal from the rate circuit 14 exceeds the signal from the radio altimeter 16.

For example, if the pilot is flying at an altitude of 100 feet and his descent rate exceeds 125 feet per minute, a warning will sound, and the pilot will have 0.8 minutes, i.e., 100 feet divided by 125 feet per minute to recover. Similarly, if the aircraft is flying at 20 feet above ground, the warning will be generated if the descent rate exceeds 25 feet per minute, and also give the pilot 0.8 minutes to recover. Thus, the pilot will have an 0.8 minute warning time between the time the "DON'T SINK" warning is generated and the projected ground impact at any altitude between 20 and 100 feet above ground if the descent rate should exceed the descent rate defined by the diagonal line of the warning envelope of FIG. 2.

In the graph illustrated in FIG. 2, the "DON'T SINK" signal is generated only for negative barometric ascent rates, i.e., only for sink rates, because in the typical operation of a heavily laden, high performance aircraft, little if any climb occurs during the initial phase of flight. However, it should be understood that the curve may be modified to include a positive barometric rate if it is to be used on aircraft that normally have some degree of climb during the initial phases of flight. Thus, it should be understood that the term "excessive descent rate" as used herein is intended to include an inadequate ascent rate for systems used in aircraft that normally climb immediately after take-off.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A warning system for providing a warning of a dangerous flight condition of an aircraft during a take-off or go-around after a missed approach phase of a flight, comprising:
  means responsive to signals representative of the altitude of the aircraft above ground, the power output of the engine and the position of the landing gear for detecting a take-off or go-around phase, and for providing a signal indicative of a take-off or go-around condition when the landing gear is up or the aircraft is above a predetermined altitude and the engine is operating at take-off power;

means responsive to signals representative of the altitude of the aircraft and the altitude rate of the aircraft for detecting an excessive descent rate and providing a signal indicative of an excessive descent rate for the altitude at which the aircraft is flying; and means responsive to the take-off or go-around phase detecting means and to the excessive descent rate detecting means for providing a warning when an excessive descent rate is detected during a take-off or a go-around phase.

2. A warning system as recited in claim 1 wherein said predetermined altitude is approximately 20 feet.

3. A system as recited in claim 1 wherein said system includes means for inhibiting the warning when the aircraft is above a second predetermined altitude.

4. A system as recited in claim 3 wherein said second predetermined altitude is approximately 100 feet.

5. A system as recited in claim 1 wherein said system includes means for inhibiting the warning when the speed of the aircraft is above a predetermined speed.

6. A system as recited in claim 5 wherein said predetermined speed is a predetermined airspeed.

7. A system as recited in claim 6 wherein said predetermined airspeed is approximately 200 knots.

8. A system as recited in claim 1 wherein said excessive descent rate detecting means includes means for generating said excessive descent rate indicative signal when the descent rate exceeds approximately 125 feet per minute when the aircraft is at an altitude of approximately 100 feet altitude above the ground.

9. A system as recited in claim 1 wherein said excessive descent rate detecting means includes means for generating said excessive descent rate indicative signal when the descent rate exceeds approximately 25 feet per minute when the aircraft is at an altitude of approximately 20 feet above the ground.

10. A warning system for providing a warning of a dangerous flight condition of an aircraft during a take-off or go-around after missed approach phase of a flight, comprising:

means for providing a signal representative of the altitude of the aircraft above the ground;

means for providing a signal representative of the descent rate of the aircraft;

means for providing a signal indicative of the power being generated by an engine of the aircraft;

means for providing a signal representative of the position of the landing gear of the aircraft; and means responsive to said altitude signal providing means, said descent rate signal providing means, said power indicative signal providing means and said landing gear position signal providing means for providing a warning when the descent rate exceeds a predetermined value determined by the altitude at which the aircraft is flying when the landing gear is up and the power of the engine is at a predetermined level.

11. A warning system as recited in claim 10 wherein said engine power indication providing means includes a tachometer.

12. A system as recited in claim 10 wherein said system includes means for inhibiting the warning when the aircraft is above a second predetermined altitude.

13. A system as recited in claim 12 wherein said second predetermined altitude is approximately 100 feet.

14. A system as recited in claim 10 wherein said system includes means for inhibiting the warning when the speed of the aircraft is above a predetermined speed.

15. A system as recited in claim 14 wherein said predetermined speed is a predetermined airspeed.

16. A system as recited in claim 15 wherein said predetermined airspeed is approximately 200 knots.

17. A system as recited in claim 10 wherein said excessive descent rate detecting means includes means for generating said excessive descent rate indicative signal when the descent rate exceeds approximately 125 feet per minute when the aircraft is at an altitude of approximately 100 feet altitude above the ground.

18. A system as recited in claim 10 wherein said excessive descent rate detecting means includes means for generating said excessive descent rate indicative signal when the descent rate exceeds approximately 25 feet per minute when the aircraft is at an altitude of approximately 20 feet above the ground.

19. A warning system for providing a warning of a dangerous flight condition of an aircraft during a take-off or go-around after a missed approach phase of flight, comprising:

means for providing signals representative of the altitude of the aircraft above the ground and the descent rate of the aircraft; and means responsive to said altitude signal providing means and said descent rate signal providing means for detecting an excessive descent rate and providing a warning indicative of an excess descent rate when the aircraft is flying between approximately 20 and 100 feet above the ground when the flight path is such that if allowed to continue would result in an impact with the ground within approximately 0.8 minutes, wherein said system includes means for inhibiting the warning if the airspeed exceeds a predetermined value.

20. A warning system as recited in claim 19 wherein said predetermined value of said air-speed is approximately 200 knots.

21. A warning system as recited in claim 19 wherein said system includes means for inhibiting said warning if the landing gear is not up when the altitude above ground is greater than approximately 20 feet, or if the power output of the engine is below a predetermined value representative of take-off power.

22. A warning system for providing a warning of a dangerous flight condition of an aircraft during a take-off or go-around after a missed approach phase of a flight, comprising:

means for providing signals representative of the altitude of the aircraft above the ground and the descent rate of the aircraft; and means responsive to said altitude above ground signal providing means and said descent rate signal providing means for detecting an excessive descent rate and providing a warning indicative of an excessive descent rate when the aircraft is flying between approximately 20 and 100 feet of altitude above the ground and when the descent rate exceeds approximately 125 feet per minute at approximately 100 feet of altitude and approximately 25 feet per minute at approximately 20 feet of altitude wherein said system includes means for determining the power output of the engine and the position of the landing gear, said system further including means for inhibiting the generation of said warning if the landing gear is down when the altitude of the aircraft is above approximately 20 feet of altitude; further including means for providing a signal indicative of the take-off power of the aircraft and means responsive to said take-off power for providing means for inhibiting the generation of said warning if the take-off power is not present.

23. A warning system as recited in claim 22 further including means responsive to the airspeed of said aircraft for inhibiting the generation of said warning when the airspeed is above approximately 200 knots.

24. A method for determining a dangerous flight condition of an aircraft during a take-off or a go-around after a missed approach phase of a flight, comprising the steps of:
  determining the power output of an engine of the aircraft;
  determining the position of the landing gear of the aircraft;
  determining the altitude of the aircraft;
  determining the descent rate of the aircraft; and
  generating a warning if the descent rate of the aircraft is excessive for the altitude at which the aircraft is flying, provided that the landing gear of the aircraft is up or the aircraft was below a predetermined altitude and the engine is developing take-off power.

* * * * *